United States Patent [19]
Van Erden et al.

[11] Patent Number: 5,886,058
[45] Date of Patent: Mar. 23, 1999

[54] INLINE SOLID STATE POLYMERIZATION OF PET FLAKES FOR MANUFACTURING PLASTIC STRAP

[75] Inventors: Donald Van Erden, Wildwood; Gary L. Vadnais, Grayslake; Manuel C. Enriquez, Morton Grove; Karl G. Adams, Schaumburg; James P. Nelson, Naperville, all of Ill.

[73] Assignee: Illinois Tool Works Inc., Glenview, Ill.

[21] Appl. No.: 794,538

[22] Filed: Feb. 3, 1997

[51] Int. Cl.$^6$ ....................................................... C08J 11/04
[52] U.S. Cl. ........................... 521/48; 525/444; 528/308.3
[58] Field of Search .............................. 521/48; 525/444; 528/308.3

[56] References Cited

U.S. PATENT DOCUMENTS

| | | | |
|---|---|---|---|
| 3,767,601 | 10/1973 | Knox | 525/48 |
| 4,022,863 | 5/1977 | Karass | 264/210 R |

OTHER PUBLICATIONS

Article—Titled: The Role of Additives in the solid State Polycondensation of Recycled Polyethylene Terephthalate (PET) in ARC'96 Technology The Spark in Recycling Publication, Nov. 7,8, 1996—Authors—Ulrich B. Steiner and Camille Borer.

*Primary Examiner*—Patricia A. Short
*Attorney, Agent, or Firm*—Schwartz & Weinrieb

[57] ABSTRACT

The present invention describes a process of making strap using both post consumer and non-post consumer PET of wide distribution intrinsic viscosity (IV) through direct solid state polymerization in a flaked state to produce PET with increased, heterogenous IV suitable for high performance strap extrusion. The process increases the IV of post-consumer resins, consisting principally of polyethylene terephthalate (PET), by chopping the post-consumer plastic into flakes and chunks, rolling the flakes and chunks, pre-heating the flakes, and further heating the flakes and chunks in an atmosphere of hot nitrogen gas, thereby increasing the intrinsic viscosity. PET polymers having increased viscosities according to the present invention provide a polymer useful in manufacturing high performance strap.

18 Claims, 5 Drawing Sheets

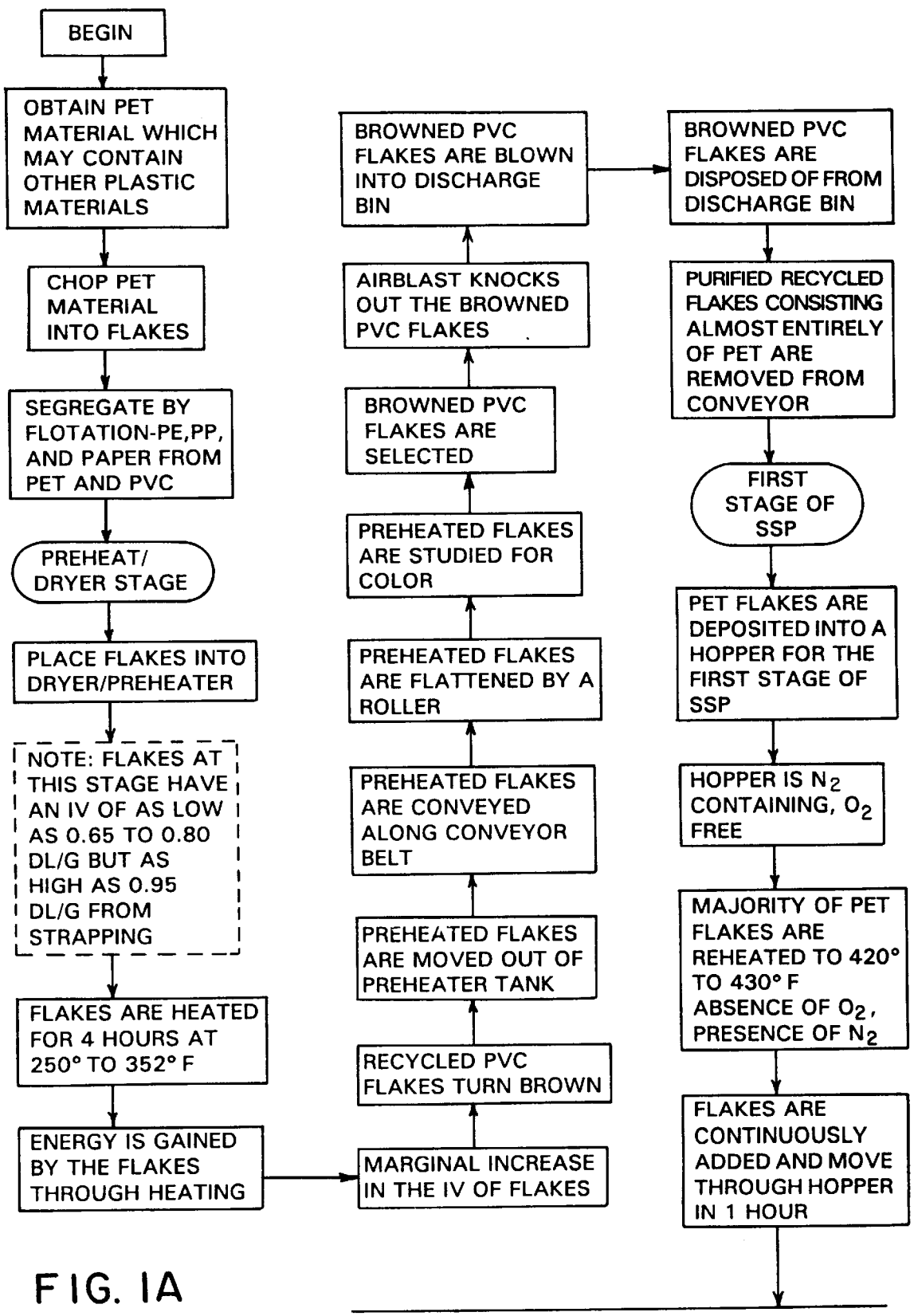
FIG. IA

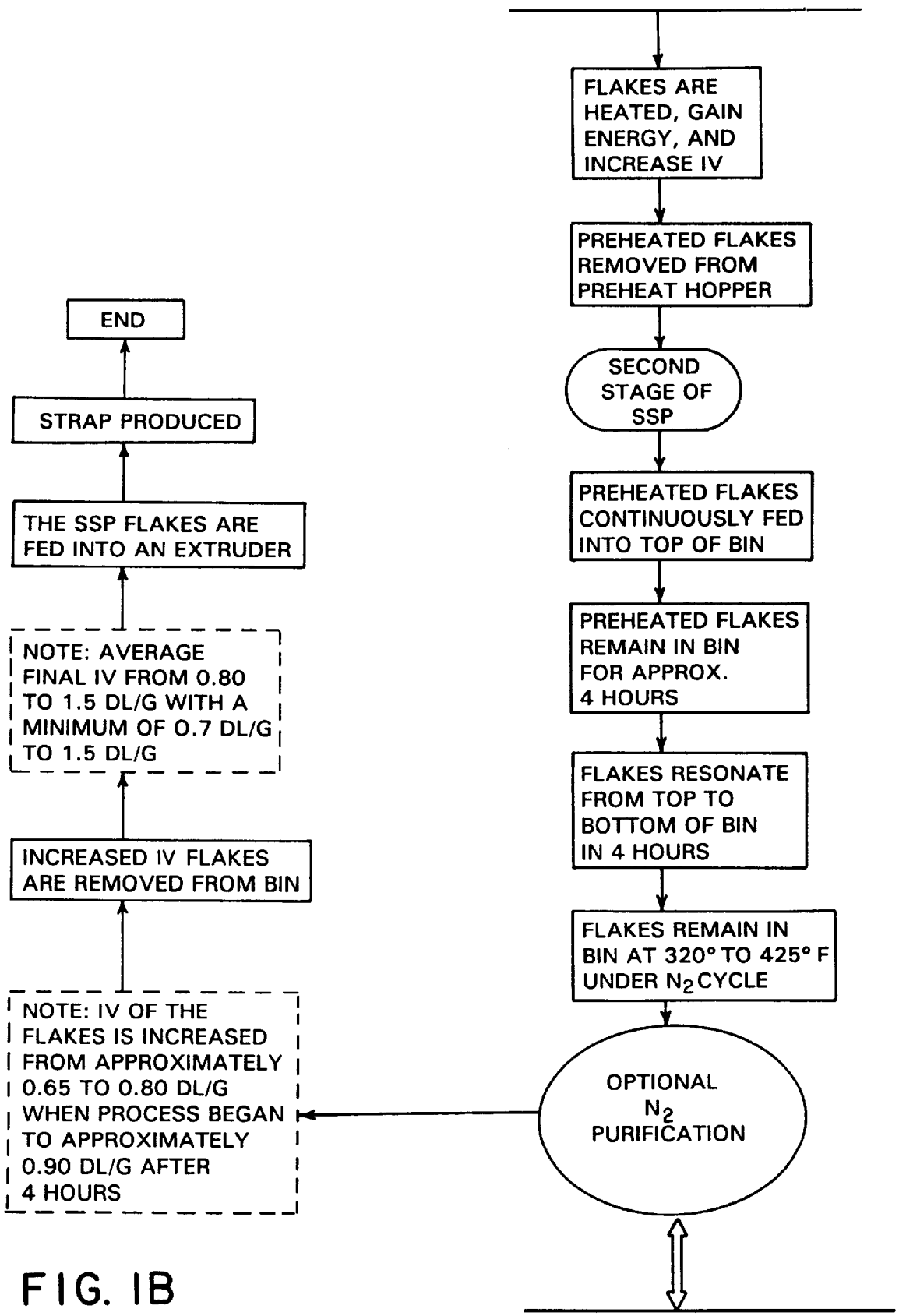
FIG. IB

INLINE SOLID STATE POLYMERIZATION OF PET FLAKES FOR MANUFACTURING PLASTIC STRAP

BACKGROUND OF THE INVENTION

1. Field of the Invention

This invention relates generally to solid state polymerization of post consumer and non-post consumer polyethylene terephthalate (PET), and more particularly to the polymerization of polyethylene terephthalate (PET) flakes in connection with the manufacture of plastic strapping.

2. Description of the Related Act

Post consumer PET, whose primary source is from plastic soft drink bottles, can be obtained from material recovery facilities. It is used to form, for example, fiberfill for insulating material in clothing and fiber material used to produce carpeting. It is of relatively low and heterogeneous intrinsic viscosity (IV). In the past, this characteristic has prevented PET from being used directly to produce products which require high or homogeneous IV. It is one of the discoveries of this invention that the heterogeneity of the IV of PET does not adversely affect strap production.

In the prior art, the PET obtained, whether post consumer or not, was chopped into flakes and chunks which were then re-extruded into pellets. The chopped PET has a relatively wide range of IV because the various soft drink bottles are made from different IVs, typically being on the order of 0.65–0.80 dl/g. The prior art has consistently taught that in order to make a high performance product from this post consumer PET material it is necessary to have a narrow range of IV material after the solid state processing which required, as an initial step, to pelletize the flakes before solid state polymerization. In order to raise and achieve a narrow range of IV of the PET-pellets, the prior art teaches to submit the PET pellets to solid state polymerization. The pellets once solid state polymerized, are then used in the production of new, higher performance products such as strapping.

The prior art begins the solid state polymerization (SSP) process with pellets of uniform geometry. The prior art SSP process, using pellets for strap production, took approximately 12 to 19 hours to complete and it was not appreciated that a heterogeneous mixture of flakes and chunk like material could be solid stated directly to the same average IV as pellets significantly faster and on the order of about ¼ the time as for pellets. Additionally, as noted, it was believed that flakes with a wide IV range could not be solid stated directly without first being pelletized to a state suitable for production of high performance strap, suitable meaning not only of a high enough average IV but also having a narrow range of IV. The solid state polymerization of pellets was intended to result in, and did in fact result in, a narrow IV range which those skilled in the art believed was necessary in order to make a high performance product. The resulting prior art strap did not have an average IV greater than 0.90 dl/g. In contrast, it has been discovered that, contrary to the prior art teachings, high performance plastic strap having an average IV of greater than 0.90 dl/g can be made commercially in an economical manner using a PET having a wide distribution of IV after being solid stated directly from a flaked state without pelletization.

SUMMARY OF THE INVENTION

It is desirable to find versatile ways of reusing post consumer PET and other forms of PET. One way of reusing this material is by increasing its IV so that it may be used to produce high performance polyester strapping.

An advantage of the present invention is that solid state polymerization occurs faster with flakes than with the prior art pellets. The process of polymerization of this invention takes approximately 3.5 hours to raise the materials' IV to an average level suitable for making high performance strapping.

Another advantage of the present invention is that once the flakes have been heated for solid stating there is no need to transport the flakes to a distant location and thereby lose heat energy which is needed, and which would otherwise be re-added, to dry the material prior to extrusion.

Another advantage of the present invention is that PET input material and resultant flakes with a wide range of IV can be subjected to SSP and used to produce a high performance product such as strap.

Yet another advantage of the invention is that the entire post consumer PET bottle may be used, including the ground, chunk-like neck portions, in one embodiment, by rolling the neck portions of the bottle into a thin more flake-like state thereby improving its geometry for more effective solid stating.

Accordingly, the present invention provides a process of converting post consumer PET to a relatively high average intrinsic viscosity polymer directly from flakes useful in manufacturing products, such as strap. High performance strap, that is, one having a raised average IV providing increased performance characteristics over prior art high performance strap with a wide distribution of IV can be made by the process of this invention.

A high performance strap has an increased weld strength. This weld strength is often the weak link in a strap product. A weld strength equal to 50% tensile strength of the strap is normal for a high performance strap prior to this invention. In the present invention, the tensile strength of the strap has been increased up to 30% greater than the prior art high performance straps. Generally, when tensile strength is increased, percentage joint strength decreases. The process of the present invention not only retains joint strength, but actually increases percentage joint strength. The process of the present invention not only produces a strap with the required 50% joint strength, but goes beyond such to as high as an average 80% joint strength. The above relationships help clarify what is meant by a "high performance" strap as embodied in prior art straps and in a strap made according to the teachings of the present invention.

The process according to the invention begins by obtaining post and non-post consumer material containing PET. This material is obtained from strap or from material recovery facilities and has a wide range of initial IV ranging from approximately 0.60 to 0.80 dl/g. The PET material may contain a variety of impurities, such as PVC.

Then, the PET and PVC material is chopped into a heterogeneous mixture of flakes and chunks. The PET and PVC flakes and chunks are preheated in a drier at approximately 350° F. for 3.5 hours. They are heated so that the PET is dried and the PVC flakes and chunks are browned. The PET and browned PVC material is discharged through a pair of flattening rolls which pass the flakes generally undisturbed but flatten the chunks into a more flake-like state. The browned PVC flakes are removed. Their removal may be effectuated through the use of a color-sensitive camera.

The PET flakes, from which the PVC flakes have now been removed, next enter the first stage of SSP. They are placed into a hopper and heated in the absence of oxygen and in the presence of nitrogen until they reach a temperature of approximately 420° to 430° F.

The flakes are now ready to enter the second stage of solid state polymerization. The heated mixture is removed from the hopper and placed into a bin in the absence of oxygen and in the presence of a nitrogen cycle for approximately 4 hours. At this point, the flakes travel from the top to the bottom of the bin. The flakes remain at a temperature of approximately 425° F. in this second stage of solid state polymerization.

Once the flakes have completed the first and second stages of SSP, the average IV of the resulting material is increased to at least 0.90 dl/g, and to as high as 1.50 dl/g, with and on the average being about 0.95 dl/g. The increased IV flakes are then extruded through an extruder to produce strap. The strap produced by the method of this invention, utilizing flakes which have been subjected to SSP directly in the flake state and resulting in a material having a raised average IV, but still having a wide distribution of IV of 0.90 dl/g to 1.50 dl/g, produces a high performance strap also having a wide distribution of IV with an average IV of about 0.95 dl/g and at least as good weld characteristics and higher joint strength than the prior art. Advantageously, this is achieved in a significantly shorter time period than prior art processes and the prior art pelletizing step is also eliminated.

In the prior art, pellets required approximately 12 to 19 hours to undergo SSP. The process of the present invention solid states PET directly from flakes rather than first pelletizing the flakes which, as noted, has been found to undergo SSP much faster than pellets. Flakes require only approximately 4 hours to undergo SSP to an average IV suitable for making a high performance strap. Further, because of the reduced time required for flakes to undergo SPP to a given IV than pellets, it is possible to increase the residence time of the flakes during SSP so as to economically produce an increasingly high IV material directly from flakes than from pellets further increasing the performance characteristics, for example, the tensile and weld strength, of the strap produced over prior art strap.

BRIEF DESCRIPTION OF THE DRAWINGS

Various other objects, features, and attendant advantages of the present invention will be appreciated from the following detailed description when considered in conjunction with the accompanying drawings in which like reference characters designate like or corresponding parts throughout the several views, and wherein:

FIGS 1A–1C comprise a flow chart of the process of this invention.

DESCRIPTION OF THE PREFERRED EMBODIMENTS

Figure 1C:
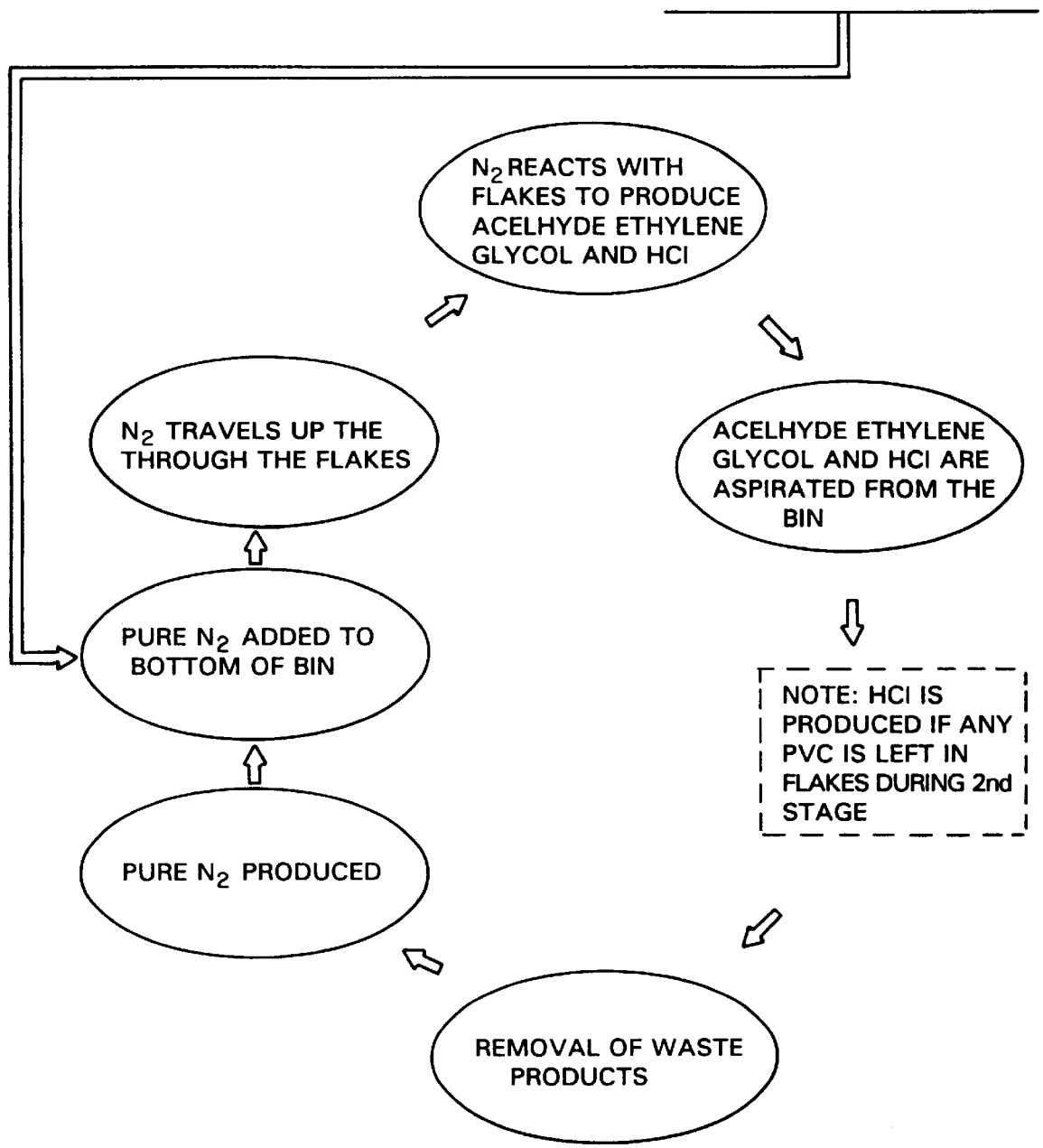

In accordance with a preferred embodiment, the present invention is carried out by the following sequential steps:

Post and non-post consumer polyethylene terephthalate (PET) is gathered from one or more available sources, including material recovery facilities, and the gathered material is co-mingled into a heterogeneous mixture. Included with the obtained PET is usually a minority of PVC, polypropylene material, and other unwanted materials and impurities. The heterogeneous mixture of majority PET post consumer material and the minority PVC post consumer material is then chopped into flakes and chunks suitable for the particular material handling system to be used. The flakes are produced from bottle walls and the chunks from bottle necks. The chunks are substantially thicker than the wall flakes. The PET and unwanted materials are initially separated by floatation separation. Polypropylene, polyethylene, and paper material floats to the top of the floatation separator. PVC and PET material sink to the bottom of the floatation separator. The obtained PET and PVC material has an initial generally wide IV distribution ranging from approximately 0.60 to 0.80 dl/g with an average initial IV of approximately 0.75 dl/g as shown by curve A in the graph of FIG. 3.

The initial IV of the PET starting material mixture falls within a relatively wide range from 0.60 to 0.80 dl/g. This is due to the fact that the PET is obtained from various sources. Some sources may consist of a relatively low IV of 0.60 dl/g while others may have a relatively high IV of 0.80 dl/g. It is of course possible to recycle, in addition to other lower IV materials, used high performance strap made by either prior art processes or by the process of this invention in which such strap can have an IV average up to about 0.90 dl/g for present high performance strap or when high performance strap produced by this new process in recycled with even higher IVs. A resultant preferred material produced by this invention from this heterogeneous mixture having a broad distribution of relatively low average initial IV materials is a material also having a relatively wide distribution of IV but on the average being raised to 0.95 dl/g as shown by curve B of the graph of FIG. 3.

The above graph is representative of expected results according to a preferred embodiment of the present invention under a particular set of processing parameters. The shape of the resultant curves will depend upon specific input characteristics and processing parameters. However, the general result of obtaining a product having a broad range of IV but of an average level acceptable for making a high performance strap from input material having a wide range of generally low IV is shown. Also shown by curve D in the graph of FIG. 3 is the general increase in final average IV with a longer residence time wherein the average IV is further increased with only minimum reduction in the still wide distribution of IV within the final material.

It should be noted that a SSP material having an average IV corresponding to that of 85 dl/g and obtainable according to present day processes prior to this invention which are suitable for making high performance strap having presently acceptable quality and performance characteristics can be made by the method according to this invention by merely reducing the residence time in the process. Accordingly and advantageously, present day quality high performance strap, that is, one having an average IV, tensile strength and weldability meeting present day requirements for such strap, can be manufactured faster and more economically should the enhanced high performance strap properties which are now economically possible with the process according to this invention not be required for a particular application. The curve marked C in the graph of FIG. 3 shows this expected result of reducing residence time. As shown and as noted, the resultant average IV of about 0.80 dl/g (with a wide range of IV distribution)is suitable for making a present day quality high performance strap but does not require the intermediate pelletization step of the prior art process because, as discovered, wide IV distribution does not adversely effect strap performance as previously believed.

Figure 3:
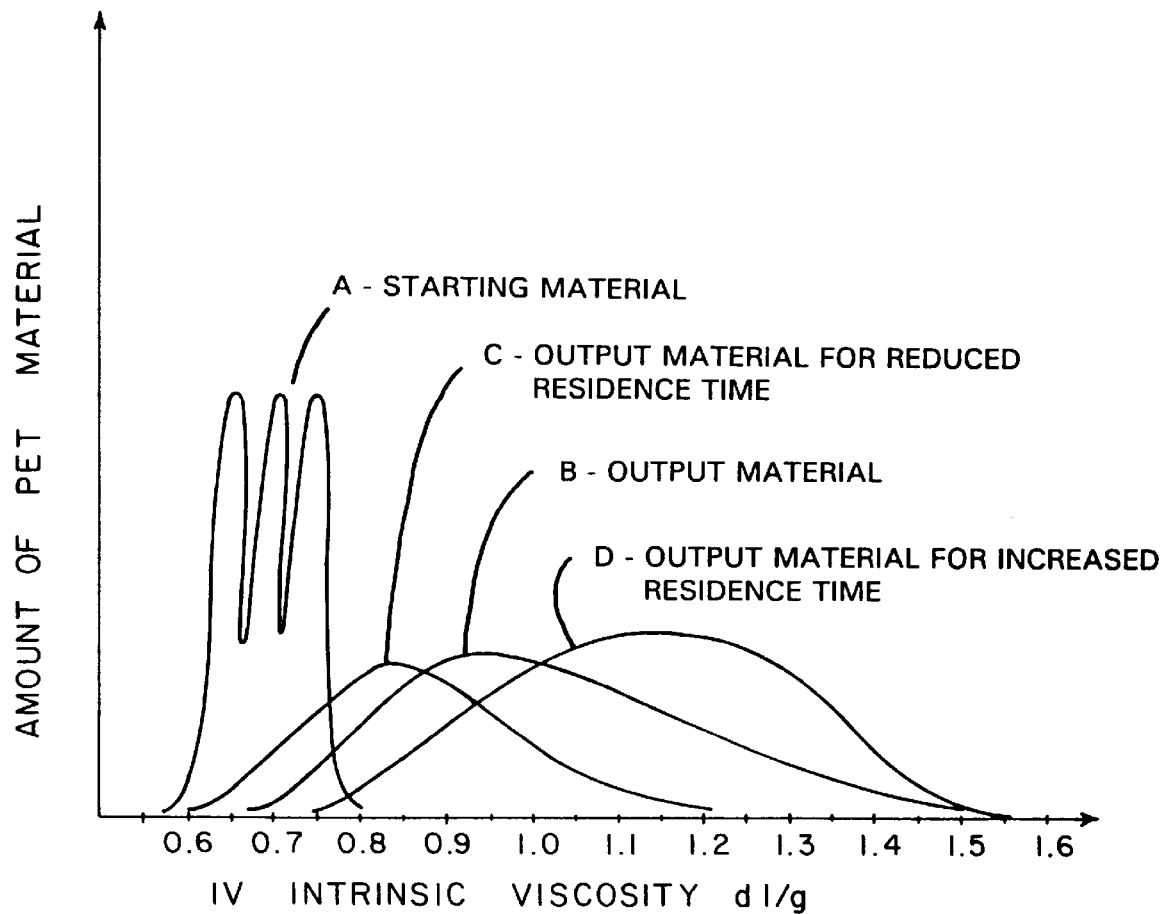
FIG. 3 is a graph showing the relationship between the amount of PET material and the intrinsic viscosity (IV) for a starting material and various resulting materials produced under different conditions.

Once the flakes and chunks have undergone the process of this invention, as seen in the graph of FIG. 3 and as noted, the resulting material has an IV distribution covering a broad range from as low as 0.70 dl/g to as high as 1.5 dl/g. On the average the IV of the resulting material is 0.95 dl/g. This is due to the fact that chunks that start out the process with a low IV of 0.60 dl/g will only minimally increase in IV to approximately 0.70 dl/g due to considerations of shape and low starting IV while other flake and particles will increase in IV to a significantly greater degree up to 1.5 dl/g. It is one of the discoveries of this invention that good performance qualities, for example, tensile strength, are reliant upon average final IV and are not reliant upon a narrow range of high IV product being formed as previously believed.

At this point, the initial material is placed into a drier for the preheat stage. In the drier, the PET and PVC material is heated for approximately 3.5 hours at approximately 270° to 352° F. While in the drier, the PVC material turns brown at temperature ranges from 270° to 352° F. Then, the preheated material, including the browned PVC, is removed from the preheat tank and discharged through a pair of flattening rolls.

The flattening rolls pass the flakes through the nip generally undisturbed but flatten the neck chunks. By flattening the thick neck chunks, their geometry becomes more like wall flakes. However, when these rolled neck pieces are heated to a solid stating temperature of approximately 420° F. it has been found that they tend to reform themselves back into their original shape. Yet, as an unexpected benefit of this invention, if the neck pieces are crystallized in a drier before they are flattened, although when heated to approximately 420° F. they still tend to reform, it has been found that they will do so with many cracks or splits being formed. These cracks and splits reduce the distance from any point within the piece to a surface. Therefore, these reformed, cracked pieces solid state much like flakes, that is, to a given IV in a shorter time than chunks or pellets.

The flakes are then conveyed along a conveyor belt and studied by a highly sensitive camera for color. The camera is able to isolate the browned PVC flakes. The positions of the browned PVC flakes are identified and an air blast or other means knocks the browned PVC flakes from the conveyor belt into a discharge bin. At this point, the material has been purified of the unwanted PVC flakes and now consists of a majority of solely PET flakes. The browned removed PVC flakes are weighed and compared to the weight of the entire sample of PET and PVC flakes that went through the preheater. The weight of the browned PVC flakes in combination with the weight of the preheated PET flakes should equal the weight of the starting material consisting of both PET and PVC flakes giving an indication that all PVC impurities have been removed.

One benefit obtained by using a drier is that the browned PVC flakes can be sorted by color from the remaining PET flakes. A benefit of removing the PVC flakes during solid state polymerization is to prevent production of hydrochloric acid which tends to damage the equipment used in the second stage of solid state polymerization. Furthermore, if PVC is found in the flakes once they have undergone the solid state polymerization process, brown streaks will be found on the extruded film. If the PVC flakes are not removed, they may also clog the melt filtration in the extruder. If PVC is found in high concentration in the flakes, the intrinsic viscosity (IV) of the material may be decreased. Additionally, the drier stage removes molecular water from the flakes, increases marginally the intrinsic viscosity of the flakes, and increases the storage of energy in the flakes.

From the drier, the preheated flakes are moved to the first stage of solid state polymerization. The thickness of the product affects the time required to solid state to a given IV. The thicker neck chunks are slower in solid stating to an increased IV than the thinner wall flakes. Generally, the ratio is 12 hours for neck pieces to increase in IV by SSP as compared to 3 hours for the same increase for wall pieces. The first stage consists of bringing the temperature of the majority of PET flakes up by depositing them into a hopper. The hopper consists of an oxygen-free environment in which nitrogen is disbursed. The temperature of the material in the hopper is brought up to 420° F. The flakes are continuously added to the hopper and move through the hopper. In moving from the top of the hopper to the bottom of the hopper, the flakes are exposed to the increased temperatures from approximately 420° F. to 430° F. and experience an additional slight increase in intrinsic viscosity. In one embodiment, this first stage takes approximately one hour.

From the hopper, the heated flakes are then ready to enter the second stage of solid state polymerization. The flakes are continuously fed into a bin. The heated PET flakes are contained within the bin for approximately 4 hours during which they travel from the top of the bin to the bottom of the bin. The temperature is raised in the bin from 380° to 425° F. under a nitrogen cycle. In this stage, the intrinsic viscosity of the PET flakes, which initially fell within the range of approximately 0.60 to 0.80 dl/g, increases substantially and the PET flakes exit the process at an average IV of approximately 0.95 dl/g and with a wide distribution of IV ranging from approximately 0.70 dl/g to 1.5 dl/g. These heated high intrinsic viscosity flakes may then be fed directly into an extruder and a high performance strap produced. High performance strap having an IV of at least 0.90 dl/g can be produced with this new process. Prior to this invention no strap having an IV of at least 0.91 dl/g is known to have been made and such strap represents a significant advance in the field.

The nitrogen cycle used in the second stage of solid state polymerization is shown in the schematic flow diagram of FIG. 1C and consists of supplying pure nitrogen to the bottom of the bin and aspirating contaminants from the top of the bin. Nitrogen travels up the bin and through the flakes. In so doing, the nitrogen reduces the partial pressure of volatiles and enhances removal of volatiles such as acetaldehyde, ethylene glycol, and hydrochloric acid (HCl). It is an option to purify the nitrogen of contaminants rather than resupplying pure nitrogen to the nitrogen cycle. In this way, the nitrogen can be reused. The contaminants are removed from the nitrogen in many ways. One way is through the desiccant process formulated by Bepex®. Another manner is through removal of waste products by the catalytic oxygen process developed by Buhler®. Still a further manner to remove HCl from the nitrogen cycle is through a lime bag filter apparatus which eliminates the HCl from the flow of gas. Yet another manner to remove HCl from the nitrogen cycle is to provide for the gas to go through a water spray thereby absorbing the HCl in the water slurry.

In the second stage of solid state polymerization, the amount of HCl given off is small. Yet, HCl may cause problems in two areas of this apparatus and method. These two areas are catalyst activity and corrosion, especially where liquid water may be present. HCl is known to deactivate a platinum catalyst, but the amount of that deactivation in the present invention is not fully quantified. Increased temperature can offset some deactivation of the catalyst but at an increased risk of sintering (permanent deactivation) of the catalyst. Increasing catalyst bed size can also offset lower activity. However, this will increase catalyst cost, pressure drop and may require additional blower capacity.

HCl can also present corrosion problems, especially in the present invention where liquid water exits. Liquid water from burning hydrocarbons in the Buhler® process will tend to absorb HCl from the gas passing by and concentrate it to levels where corrosion rates are problematic. This condition appears to exist after the condenser which cools the process stream prior to the absorbent bed.

Figure 2:
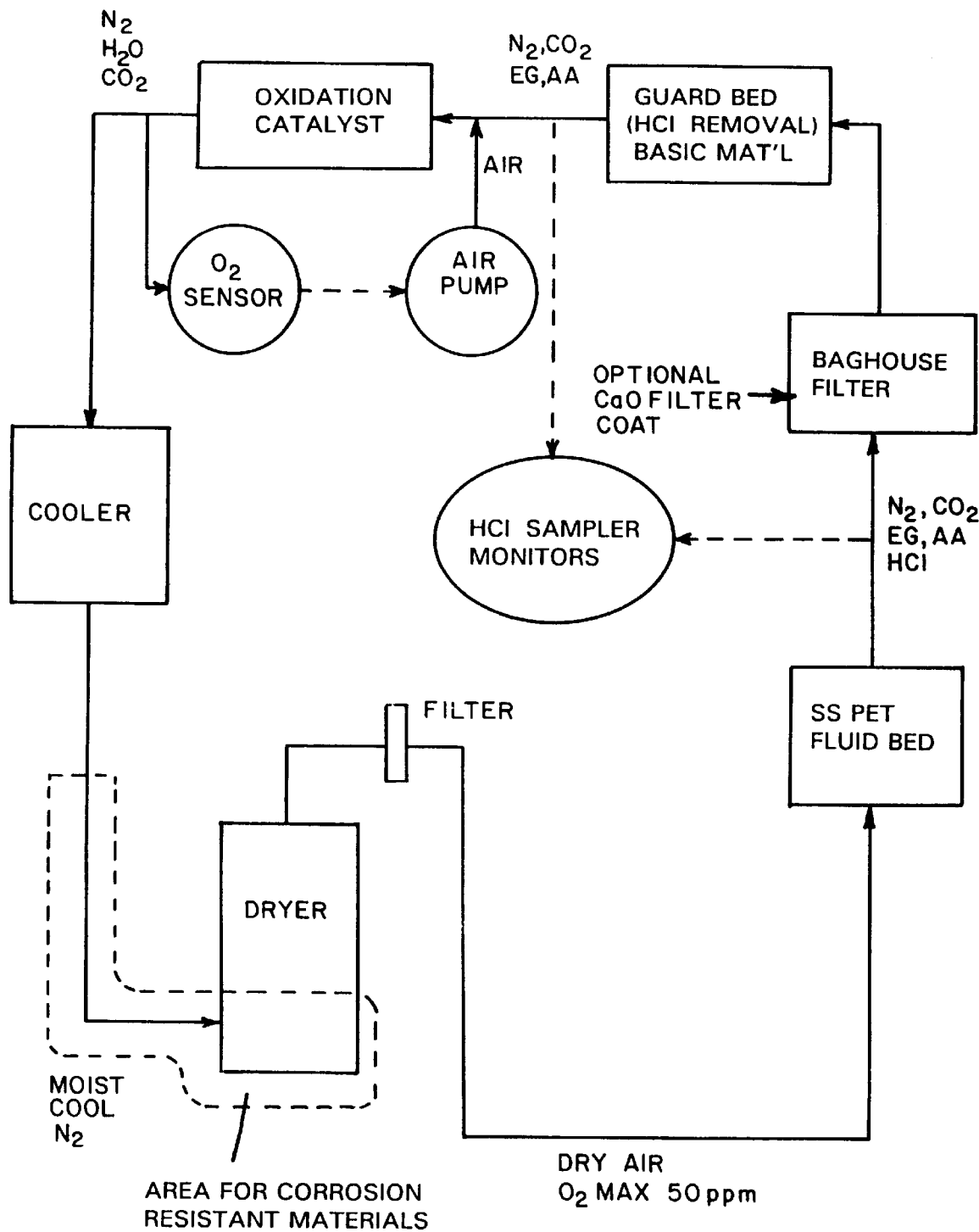
FIG. 2 is a flow chart of a nitrogen cycle portion of the solid state polymerization step of the invention including a guard bed for HCl removal.

In one embodiment, and as shown in FIG. 2 the problems of catalyst activity and corrosion may be corrected by removing the HCl from the present invention as soon as possible by utilizing a guard bed of basic material. This guard bed may be added to the Buhler® line just before the catalyst bed, or, perhaps most conveniently, incorporated in the bag house assembly just after the solid state bed. In another embodiment, the guard bed may be placed after the bag house to avoid plugging it with PET particles. In another embodiment, the simpler Bepex® design omits the catalyst bed, so the guard bed will be placed immediately after the solid state bed or in the filter. In another embodiment, the bag house filter would be coated with a basic solid such as calcium oxide, lime, caustic or bicarbonate to neutralize the acid. In this manner, the filter bag would be replaced.

In another embodiment, the guard bed may also take the form of a spray chamber of water or bicarbonate.

In yet another embodiment, the invention may also include a monitor to detect the levels of HCl. The levels of HCl could occasionally spike up as PVC material comes into the solid state fluid bed. A simple HCl monitor might consist of a small fluid stream of known flow rate into a scrubber-bubbler attached to an automated titration unit. The consumption of base to maintain constant pH would be a simple yet direct way to measure HCl. Another option is to use a commercial HCl detector instrument for detecting HCl.

In another embodiment of the invention, due to the f act that steel or even stainless steel is likely to corrode at excessive rates where liquid water is present with HCl or $Cl_2$, the apparatus of the present invention may be constructed with alternate construction materials such as CPPC, PP, or a steel with a corrosion resistant coating.

The 13× molecular sleeves used in the Buhler® desiccant process are known to degrade with acids. In yet another embodiment, a large desiccant bed may be used to make up for lost drying capacity. The deterioration of the sieve may produce powdered sieve. If this happens, the powder could be carried into the PET production and/or accumulate in the lower end of the desiccant vessel and impede gas flow. In order to prevent this from occurring, a section of the plant could be provided with filters to prevent PET contamination and easy access ports near the bottom of the apparatus which are easy to clean out. In another embodiment, this also may be prevented by directing high velocity nitrogen through the bed during the regeneration operation with a by-pass to take desiccant fumes out of the process.

After the contaminants are removed through any of these processes, the purified nitrogen is then re-added to the bottom of the bin to undergo the cycle again.

This process can be operated in a batch or in a continuous process. The nitrogen gas removes volatile polymerization reaction products including ethylene glycol along with other impurities which can cause undesirable secondary reactions. Such as, if more than parts per million of PVC is still contained in the flakes after the preheater stage, these flakes will produce HCl and degrade the desiccant used to purify the nitrogen used in the second stage of SSP. As such, the desiccant would have to be replaced more than once a year due to the reaction between HCl and the desiccant.

Returning now to the main invention, after the flakes have passed through the hopper and bin, the product is removed or fed hot to the feed hopper of the extruder from which strap is produced. The feeding of hot material to an extruder conserves significant heat in the polymer and reduces power requirements per pound of polymer in extrusion. The degree of uniformity of the product resulting from this process is surprising in view of the variety and relatively wide range of the intrinsic viscosity of the initial materials. One of the most surprising aspects of this invention is the fact that heating and solid state polymerization of consumer PET flakes proceeds readily and rapidly and without problems, such as agglomeration of polymer, polymer sticking to processing equipment, or degradation of polymer, as is often the case with pellets. A further unexpected result is high average IV obtained with a wide range of initial IV material. Another unexpected result is that a narrow range of IV is not required in either the material to be solid stated and used to make high performance strap or in the final strap itself to obtain a high quality high performance plastic strap.

The following relationships can be used to assist in obtaining the desired end results of increased intrinsic viscosity.

Intrinsic viscosity increases with increased amounts of nitrogen gas, increased temperature in solid state polymerization, and increased residence time in solid state polymerization. It has also been found that preheating the flakes to reaction temperature reduces the size of the bin necessary to effect polymerization. In addition, it has also been found that the thin flakes increase in IV much faster than pellets, and to a higher level.

Flakes are also desirable because, unlike pellets, they do not get sticky in the second stage of solid state polymerization.

Oxygen is not added during either the preheat or the solid state polymerization stages because the presence of oxygen will degrade and color the polymers. Nitrogen is the preferred gas to be used in solid state polymerization because it is inert, economical and readily available.

Other variations are encompassed by the present invention, and the scope of the invention is to be limited only by the following claims.

We claim:

1. A process for making a polyethylene terephthalate (PET) material, comprising the steps of:
   collecting diverse PET material having a wide distribution of intrinsic viscosity (IV) values, primarily within the range of 0.60 dl/g to 0.80 dl/g, but as high as 0.90 dl/g, and wherein the difference in said IV values of said collected PET material is at least 0.20 dl/g;
   co-mingling said collected PET material and reforming said co-mingled PET material into a heterogeneous IV mixture of PET material comprised substantially of a plurality of non-uniform flake-like and chunk-like pieces; and
   directly subjecting said heterogeneous IV mixture of PET material to solid state polymerization (SSP) so as to form a heterogeneous PET material having an average IV value of at least 0.85 dl/g.

2. The process of claim 1, further comprising the step of:
   further reforming said co-mingled heterogeneous IV mixture of flake-like and chunk-like pieces by refining the chunk-like pieces into flake-like pieces.

3. The process of claim 2, wherein the step of further reforming said co-mingled heterogeneous IV mixture comprises the step of:

rolling said heterogeneous IV mixture of flake-like and chunk-like pieces under pressure so as to flatten said chunk-like pieces into flake-like pieces.

4. The process as set forth in claim 1, further comprising the step of:

identifying any PVC particles, found in said heterogeneous IV mixture of PET material formed during said collecting, co-mingling, and reforming steps, and removing said identified PVC particles, prior to said solid-state polymerization.

5. The process as set forth in claim 4, wherein the step of identifying and removing said PVC particles comprises the steps of:

heating said reformed heterogeneous IV mixture to a temperature at which said PVC particles turn a brown color; and removing substantially all of said brown colored particles from said reformed heterogeneous IV mixture.

6. The process of claim 1 wherein said solid state polymerization step comprises the steps of:

incorporating a nitrogen cycle within said solid state polymerization; and removing a majority of HCl contaminant, formed during said nitrogen cycle portion of said solid state polymerization step, by passing the nitrogen said nitrogen cycle, and including said HCl contaminant, through a guard bed of basic material.

7. The process as set forth in claim 1, wherein:

said formed heterogeneous PET material has an average IV value of at least 0.90 dl/g.

8. The process as set forth in claim 7, wherein:

said formed heterogeneous PET material has an IV range of 0.90 dl/g to 1.5 dl/g.

9. A process for making a polyethylene terephthalate (PET) material, suitable for use in making a high performance plastic strap, comprising the steps of:

collecting diverse PET material having a wide distribution of intrinsic viscosity (IV) values. Primarily within the range of 0.60 dl/g to 0.80 dl/g, but as high as 0.90 dl/g, and wherein the difference in said IV values of said collected PET material is at least 0.20 dl/g;

co-mingling said collected PET material and reforming said co-mingled PET material into a heterogeneous IV mixture of PET material comprised substantially of a plurality of non-uniform flake-like and chunk-like pieces; and directly subjecting said heterogeneous IV mixture of PET material to solid state polymerization (SSP) so as to form a heterogeneous PET material having an average IV value of at least 0.85 dl/g.

10. The process as set forth in claim 9, further comprising the step of:

extruding said solid stated PET material so as to make a high performance plastic strap.

11. The process as set forth in claim 10 wherein:

said high performance plastic strap made with said solid stated PET material has an IV value of at least 0.90 dl/g.

12. The process as set forth in claim 9 wherein:

said formed heterogeneous PET material has an IV range of 0.90 dl/g to 1.5 dl/g.

13. The process as set forth in claim 9, wherein:

said formed heterogeneous PET material has an average IV value of at least 0.9 dl/g.

14. The process as set forth in claim 9, further comprising the step of:

further reforming said co-mingled heterogeneous IV mixture of flake-like and chunk-like pieces by refining said chunk-like pieces into flake-like pieces.

15. The process as set forth in claim 14, wherein the step of further reforming said co-mingled heterogeneous IV mixture comprises the step of:

rolling said heterogeneous IV mixture of flake-like and chunk-like pieces under pressure so as to flatten said chunk-like pieces into flake-like pieces.

16. The process as set forth in claim 9, further comprising the step of:

identifying any PVC particles, found in said heterogeneous IV mixture of PET material formed during said collecting, co-mingling, and reforming steps, and removing said identified PVC particles, prior to said solid-state polymerization.

17. The process as set forth in claim 16, Wherein the step of identifying and removing said PVC particles comprises the steps of:

heating said reformed heterogeneous IV mixture to a temperature at which said PVC particles turn a brown color; and removing substantially all of said brown colored particles from said reformed heterogeneous IV mixture.

18. The process as set forth in claim 16, wherein said solid state polymerization step comprises the steps of:

incorporating a nitrogen cycle wihtin said solid state polymerization; and removing a majority of HCl contaminant, formed during siad nitrogen cycle portion of said solid state polymerization step, by passing the nitrogen in said nitrogen cycle, and including said HCl contaminant, through a guard bed of basic material.

* * * * *